(12) United States Patent
Kasada et al.

(10) Patent No.: US 9,601,146 B2
(45) Date of Patent: Mar. 21, 2017

(54) MAGNETIC TAPE

(71) Applicant: FUJIFILM Corporation, Minato-ku, Tokyo (JP)

(72) Inventors: Norihito Kasada, Minami-ashigara (JP); Masahito Oyanagi, Minami-ashigara (JP); Toshio Tada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/753,227

(22) Filed: Jun. 29, 2015

(65) Prior Publication Data
US 2015/0380036 A1 Dec. 31, 2015

(30) Foreign Application Priority Data
Jun. 30, 2014 (JP) .................. 2014-135220

(51) Int. Cl.
G11B 5/708 (2006.01)
G11B 5/78 (2006.01)
G11B 5/70 (2006.01)
G11B 5/714 (2006.01)

(52) U.S. Cl.
CPC .................. *G11B 5/78* (2013.01); *G11B 5/70* (2013.01); *G11B 5/714* (2013.01)

(58) Field of Classification Search
None
See application file for complete search history.

(56) References Cited

U.S. PATENT DOCUMENTS

| | | | | |
|---|---|---|---|---|
| 5,728,454 A | * | 3/1998 | Inaba | G11B 5/70 427/128 |
| 6,770,359 B2 | | 8/2004 | Masaki | |
| 2003/0124386 A1 | | 7/2003 | Masaki | |
| 2013/0084470 A1 | * | 4/2013 | Hattori | G11B 5/7013 428/842.3 |

FOREIGN PATENT DOCUMENTS

JP     2003-077116 A     3/2003

\* cited by examiner

*Primary Examiner* — Holly Rickman
*Assistant Examiner* — Linda Chau
(74) *Attorney, Agent, or Firm* — Sughrue Mion, PLLC

(57) ABSTRACT

An aspect of the present invention relates to a magnetic tape comprising a magnetic layer comprising ferromagnetic powder and binder on a nonmagnetic support, wherein ΔSFD in a longitudinal direction of the magnetic tape as calculated with Equation 1 ranges from 0.35 to 1.50:

$$\Delta SFD = SFD_{25°\,C.} - SFD_{-190°\,C.}$$ Equation 1 wherein, in Equation 1, $SFD_{25°\,C.}$ denotes a switching field distribution SFD as measured in the longitudinal direction of the magnetic tape in an environment with a temperature of 25° C., and $SFD_{-190°\,C.}$ denotes a switching field distribution SFD as measured in the longitudinal direction of the magnetic tape in an environment with a temperature of −190° C.

19 Claims, No Drawings

MAGNETIC TAPE

CROSS-REFERENCE TO RELATED APPLICATIONS

This application claims priority under 35 U.S.C 119 to Japanese Patent Application No. 2014-135220 filed on Jun. 30, 2014. The above application is hereby expressly incorporated by reference, in its entirety.

BACKGROUND OF THE INVENTION

Field of the Invention
The present invention relates to a magnetic tape.
Discussion of the Background
Magnetic recording media include tape-shaped media and disk-shaped media. Magnetic recording media in the form of tapes, that is, magnetic tapes, are primarily employed in storage applications such as backup tapes.

In a magnetic tape, when the energy (magnetic energy) working to keep magnetization in ferromagnetic powder contained in a magnetic layer is unable to counter the thermal energy, so-called thermal fluctuation ends up compromising the ability to retain recordings, and it is no longer possible to ignore the phenomenon of loss of recorded information. Accordingly, increasing the stability of magnetization is desirable to maintain the ability to retain recordings. In this regard, Japanese Unexamined Patent Publication (KOKAI) No. 2003-77116 or English language family members US2003/124386A1 and U.S. Pat. No. 6,770,359, which are expressly incorporated herein by reference in their entirety, disclose specifying the temperature dependence $\Delta SFD$ (change in SFD due to change in temperature) of the switching field distribution (SFD) of the ferromagnetic powder (hexagonal ferrite) contained in the magnetic layer for enhancing the stability of magnetization and the like.

SUMMARY OF THE INVENTION

To permit the highly reliable use of magnetic tapes for extended periods, in addition to maintaining the ability to retain recordings, it is also desirable to increase running durability. That is because a magnetic tape affording both good ability to retain recordings and good running durability will be able to stably retain recorded information and reproduce it for extended periods.

On the other hand, magnetic tapes that are used in data storage applications are often employed at low temperature and low humidity (for example, in environments with temperatures of 10° C. to 15° C. and a relative humidity of about 10% to 20%), such as in data centers with regulated temperature and humidity. However, the running durability of magnetic tapes is generally thought to become more difficult to maintain at lower temperatures and humidity. The reason this occurs at low temperature and low humidity is unclear. However, it is thought to be due to a drop in the ability of the surface of the magnetic layer to remove material adhering to the head. More particularly, it is thought that the following occurs. During sliding of the magnetic tape against a reproduction head, a phenomenon whereby components derived from the magnetic tape (for example, scrapings from the surface of the magnetic tape and lubricant-derived metal salts) adhere to the reproduction head (such adhering materials are known as "head adhesion materials") may occur. If most head adhesion materials produced by sliding of the surface of the magnetic tape against the surface of the reproduction head during continuous reproduction and repeated reproduction are deposited on the reproduction head without being removed, running durability would be compromised (more particularly, a drop in running durability and/or fluctuation in output, for example). The reason for this is unclear. However, at low temperature and low humidity, when the surface of the magnetic layer of a magnetic tape slides against a reproduction head, a decrease in the ability to remove head adhesion material is thought to increase the difficulty of maintaining running durability at low temperature and low humidity.

The present inventors investigated the above point. As a result, they determined that it was difficult to achieve both the ability to retain recordings and maintenance of running durability at low temperature and low humidity in magnetic tapes in which the $\Delta SFD$ of the ferromagnetic powder was specified as disclosed in Japanese Unexamined Patent Publication (KOKAI) No. 2003-77116.

An aspect of the present invention provides for a magnetic tape affording both a good ability to retain recordings and good running durability at low temperature and low humidity.

The present inventors conducted extensive research into attaining the above object. As a result, they devised the following magnetic tape:

a magnetic tape comprising a magnetic layer comprising ferromagnetic powder and binder on a nonmagnetic support, wherein $\Delta SFD$ in a longitudinal direction of the magnetic tape as calculated with Equation 1 ranges from 0.35 to 1.50:

$$\Delta SFD = SFD_{25°\,C.} - SFD_{-190°\,C.} \qquad \text{Equation 1}$$

(In Equation 1, $SFD_{25°\,C.}$ denotes a switching field distribution SFD as measured in the longitudinal direction of the magnetic tape in an environment with a temperature of 25° C., and $SFD_{-190°\,C.}$ denotes a switching field distribution SFD as measured in the longitudinal direction of the magnetic tape in an environment with a temperature of −190° C.)

That is, the above magnetic tape was found to achieve both the ability to retain recordings and running durability at low temperature and low humidity. The temperature dependence of the switching field distribution, as stated above, is described for the temperature dependence of the switching field distribution of the magnetic powder in Japanese Unexamined Patent Publication (KOKAI) No. 2003-77116. However, in Japanese Unexamined Patent Publication (KOKAI) No. 2003-77116, there is nothing that suggests that the temperature dependence of the switching field distribution in the longitudinal direction of the magnetic tape can contribute to enhancing the running durability at low temperature and low humidity in addition to the ability to retain recordings.

In this regard, the present inventors thought that the $\Delta SFD$ in the longitudinal direction of the magnetic tape calculated with Equation 1 could serve as an indicator of the state in which the magnetic powder was present in the magnetic layer. A state in which $\Delta SFD$ is greater than or equal to 0.35 would be a state in which the ferromagnetic powder is present in the magnetic layer in a suitably random state. Such a state is presumed to contribute to maintaining running durability at low temperature and low humidity. The present inventors assume that a state in which $\Delta SFD$ is lower than or equal to 1.50 would be a state in which the ferromagnetic powder is aligned while interacting to a degree making it possible to maintain the stability of magnetization. Such a state is presumed by the present inventors to contribute to maintaining the stability of magnetization and thus enhance the ability to retain recordings. However, the above is simply a presumption of the present inventors, and is not to be construed as limiting the present invention in any way.

In one embodiment, the coercive force He in the longitudinal direction of the above magnetic tape falls within a range of 96 kA/m to 279 kA/m.

In one embodiment, the above magnetic tape comprises a nonmagnetic layer containing nonmagnetic powder and binder between the nonmagnetic support and the magnetic layer.

In one embodiment, the thickness (total thickness) of the above magnetic tape is less than or equal to 6.0 μm.

In one embodiment, the centerline average surface roughness Ra of the surface of the magnetic layer as measured with a noncontact surface profile measuring apparatus is less than or equal to 1.8 nm.

In one embodiment, the centerline average surface roughness Ra of the surface of the magnetic layer as measured with an atomic force microscope is less than or equal to 2.5 nm.

In one embodiment, the magnetic layer further comprises an abrasive.

In one embodiment, the magnetic layer further comprises nonmagnetic colloidal particles.

In one embodiment, the ferromagnetic powder is ferromagnetic hexagonal ferrite powder with an average particle size ranging from 10 nm to 50 nm.

In one embodiment, the ferromagnetic powder is ferromagnetic metal powder with an average particle size ranging from 10 nm to 50 nm.

In one embodiment, the ferromagnetic powder is ferromagnetic powder in which a difference $\Delta SFD_{powder}$ between SFD as measured in an environment with a temperature of 100° C. and SFD as measured in an environment with a temperature of 25° C. as calculated with Equation 2 ranges from 0.05 to 1.50:

$$\Delta SFD_{powder} = SFD_{powder\ 100°\ C.} - SFD_{powder\ 25°\ C.} \quad \text{Equation 2}$$

(In Equation 2, $SFD_{powder\ 100°\ C.}$ denotes a switching field distribution SFD of the ferromagnetic powder as measured in an environment with a temperature of 100° C. and $SFD_{powder\ 25°\ C.}$ denotes a switching field distribution SFD of the ferromagnetic powder as measured in an environment with a temperature of 25° C.)

An aspect of the present invention can provide a magnetic tape affording both a good ability to retain recordings and good running durability at low temperature and low humidity.

Other exemplary embodiments and advantages of the present invention may be ascertained by reviewing the present disclosure

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

Magnetic Tape

An aspect of the present invention relates to a magnetic tape comprising a magnetic layer comprising ferromagnetic powder and binder on a nonmagnetic support, wherein $\Delta SFD$ in a longitudinal direction of the magnetic tape as calculated with Equation 1 ranges from 0.35 to 1.50:

$$\Delta SFD = SFD_{25°\ C.} - SFD_{-190°\ C.} \quad \text{Equation 1}$$

(In Equation 1, $SFD_{25°\ C.}$ denotes a switching field distribution SFD as measured in the longitudinal direction of the magnetic tape in an environment with a temperature of 25° C., and $SFD_{-190°\ C.}$ denotes a switching field distribution SFD as measured in the longitudinal direction of the magnetic tape in an environment with a temperature of −190° C.)

In the present invention, a range stated using the word "to" includes the preceding and succeeding numeric values as minimum and maximum values, respectively. Unless specifically stated otherwise, magnetic characteristics for which no measurement temperature is given refer to values measured in an environment at a temperature of 25° C.

<$\Delta SFD$ Calculated with Equation 1>

$\Delta SFD$ is a value denoting the temperature dependence of the switching field distribution SFD as measured in the longitudinal direction of a magnetic tape. The smaller the value, the less the SFD changes due to temperature. The larger the value, the more the SFD changes due to temperature. The present inventors discovered that a magnetic tape in which the $\Delta SFD$, as calculated with Equation 1 indicating the difference between $SFD_{25°\ C.}$ and $SFD_{-190°\ C.}$, fell within a range of 0.35 to 1.50 could afford both a good ability to retain recordings and good running durability at low temperature and low humidity. The present invention was devised on that basis. More specifically, the fact that a magnetic tape with a $\Delta SFD$ calculated with Equation 1 that was greater than or equal to 0.35 could exhibit good running durability at low temperature and low humidity was determined by the present inventors as the result of extensive research. The fact that a magnetic tape with a $\Delta SFD$ calculated with Equation 1 that was less than or equal to 1.50 could stably retain recorded signals for extended periods without great attenuation—that is, the fact that it could exhibit a good ability to retain recordings—was also determined as the result of extensive research by the present inventors. From the perspective of running stability at low temperature and low humidity, ΔSFD is desirably greater than or equal to 0.40, preferably greater than or equal to 0.50. From the perspective of the ability to retain recordings, it is desirably less than or equal to 1.00, preferably less than or equal to 0.85. The SFD in the longitudinal direction of the magnetic tape can be measured with a known magnetic characteristic measuring apparatus, such as a vibrating sample magnetometer. The same applies to measurement of the SFD of ferromagnetic powder. The temperature during SFD measurement can be adjusted by setting the measuring apparatus.

Based on research by the present inventors, the ΔSFD could be controlled by the method used to prepare the magnetic tape. The following tendencies were observed:
(A) the more dispersion of the ferromagnetic powder was increased in the magnetic layer, the lower the value became;
(B) the lower the SFD temperature dependence of the ferromagnetic powder employed, the lower the value became; and
(C) the more aligned the ferromagnetic powder in the longitudinal direction of the magnetic layer (the greater the orientation in the longitudinal direction), the greater the value became.

For example, as regards (A), examples are intensifying the dispersion conditions (lengthening the dispersion period, reducing the diameter and increasing packing of the dispersion beads used in dispersion, and the like) and using a dispersing agent. Known dispersing agents, commercial dispersing agents, and the like can be used without limitation as the dispersing agent.

Additionally, as an example of (B), the ferromagnetic powder—in which the difference $\Delta SFD_{powder}$ between the SFD as measured in an environment with a temperature of 100° C. and the SFD as measured in an environment with a temperature of 25° C. as calculated with Equation 2 below falls within a range of 0.05 to 1.50—can be employed. However, even outside the above range, ΔSFD can be kept within the range of 0.35 to 1.50 by other controls.

$$\Delta SFD_{powder} = SFD_{powder\ 100°\ C.} - SFD_{powder\ 25°\ C.} \quad \text{Equation 2}$$

(In Equation 2, $SFD_{powder\ 100°\ C.}$ denotes the switching field distribution SFD of the ferromagnetic powder as measured in an environment with a temperature of 100° C. and $SFD_{powder\ 25°\ C.}$ denotes the switching field distribution SFD of the ferromagnetic powder as measured in an environment with a temperature of 25° C.)

As regards (C), the method of conducting vertical orientation treatment of the magnetic layer or the method of no orientation by conducting no orientation treatment can be adopted.

Accordingly, for example, by employing one of means (A) to (C), or combining any two or more to effect controls, it is possible to obtain a magnetic tape in which ΔSFD falls within a range of 0.35 to 1.50.

The magnetic tape will be described in greater detail below.

<Magnetic Layer>
(Ferromagnetic Powder)

Various powders that are commonly employed as ferromagnetic powders in the magnetic layers of magnetic tapes can be employed as the ferromagnetic powder. Ferromagnetic powder with a small average particle size is desirably employed from the perspective of enhancing the recording density of the magnetic tape. Thus, it is desirable to employ ferromagnetic powder with an average particle size of less than or equal to 50 nm. From the perspective of stability of magnetization, the average particle size of the ferromagnetic powder is desirably greater than or equal to 10 nm.

The average particle size of the ferromagnetic powder is a value measured with a transmission electron microscope by the following method.

Ferromagnetic powder is photographed at a magnification of 100,000-fold with a transmission electron microscope, and the photograph is printed on print paper at a total magnification of 500,000-fold to obtain a photograph of the particles constituting the ferromagnetic powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the ferromagnetic powder. A Model H-9000 transmission electron microscope made by Hitachi can be employed as the above transmission electron microscope, for example. The particle size can be measured with known image analysis software, such as KS-400 image analysis software from Carl Zeiss.

In the present invention, the average particle size of the powder is the average particle size as obtained by the above method. The average particle size indicated in Examples further below was obtained using a Model H-9000 transmission electron microscope made by Hitachi and KS-400 image analysis software made by Carl Zeiss.

The method described in paragraph 0015 of Japanese Unexamined Patent Publication (KOKAI) No. 2011-048878, which is expressly incorporated herein by reference in its entirety, for example, can be employed as the method of collecting sample powder such as ferromagnetic powder from a magnetic layer for particle size measurement.

In the present invention, the size of the particles constituting powder such as ferromagnetic powder (referred to as the "particle size", hereinafter) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.

(2) When platelike or columnar (with the thickness or height being smaller than the maximum diameter of the plate surface or bottom surface) in shape, the particle size is denoted as the maximum diameter of the plate surface or bottom surface.

(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

A desirable specific example of the above ferromagnetic powder is ferromagnetic hexagonal ferrite powder. From the perspectives of achieving higher density recording and stable magnetization, the average particle size of the ferromagnetic hexagonal ferrite powder is desirably an average plate diameter ranging from 10 nm to 50 nm, preferably 20 nm to 50 nm. For details regarding ferromagnetic hexagonal ferrite powder, reference can be made to paragraphs 0012 to 0030 in Japanese Unexamined Patent Publication (KOKAI) No. 2011-225417, paragraphs 0134 to 0136 in Japanese Unexamined Patent Publication (KOKAI) No. 2011-216149, and paragraphs 0013 to 0030 in Japanese Unexamined Patent Publication (KOKAI) No. 2012-204726. The contents of the above publications are expressly incorporated herein by reference in their entirety.

A specific desirable example of the ferromagnetic powder is ferromagnetic metal powder. From the perspectives of achieving high-density recording and stable magnetization, the average particle size of the ferromagnetic metal powder is desirably an average major axis length ranging from 10 nm to 50 nm, preferably 20 nm to 50 nm. Reference can be made to paragraphs 0137 to 0141 in Japanese Unexamined Patent Publication (KOKAI) No. 2011-216149 and paragraphs 0009 to 0023 in Japanese Unexamined Patent Publication (KOKAI) No. 2005-251351, for example, for details regarding ferromagnetic metal powder. The contents of the above publications are expressly incorporated herein by reference in their entirety.

(Binder, Curing Agent)

The magnetic tape of an aspect of the present invention is a particulate magnetic tape comprising binder along with ferromagnetic powder in the magnetic layer. Polyurethane resins, polyester resins, polyamide resins, vinyl chloride resins, acrylic resins such as those provided by copolymerizing styrene, acrylonitrile, methyl methacrylate and the like, cellulose resins such as nitrocellulose, epoxy resins, phenoxy resins, polyvinylacetal, polyvinylbutyral, and other polyvinyl alkylal resins can be employed singly, or as mixtures of multiple resins, as the binder contained in the magnetic layer. Among these, desirable resins are polyurethane resin, acrylic resins, cellulose resins, and vinyl chloride resins. These resins can also be employed as binders in the nonmagnetic layer described further below. Reference can be made to paragraphs 0029 to 0031 of Japanese Unexamined Patent Publication (KOKAI) No. 2010-24113, which is expressly incorporated herein by reference in its entirety, with regard to the above binders.

Further, a curing agent can be employed along with the resin suitable for use as the binder. Polyisocyanate is suitable as the curing agent. Reference can be made to paragraphs 0124 to 0125 in Japanese Unexamined Patent Publication (KOKAI) No. 2011-216149, for details regarding polyisocyanates. The curing agent can be added to the coating composition used to form the magnetic layer in a quantity of, for example, 0 to 80 weight parts, preferably 50 weight parts to 80 weight parts from the perspective of enhancing the coating strength, per 100 weight parts of binder.

(Additives)

One or more additives can be added as needed to the magnetic layer. Examples of additives are abrasives, lubricants, dispersing agents, dispersion adjuvants, antifungal agents, antistatic agents, oxidation inhibitors, solvents, and carbon black. The additives set forth above can be suitably selected for use from among commercial products based on the properties desired.

It is desirable to increase the smoothness of the surface of the magnetic layer in a magnetic tape for high-density recording, such as a data backup tape. That is because spacing loss can be reduced by increasing the smoothness of the surface of the magnetic layer. As a result, it becomes possible to achieve good electromagnetic characteristics during reproduction of a signal recorded at high density. From these perspectives, the magnetic tape of an aspect of the present invention desirably also has a magnetic layer with a highly smooth surface.

In one embodiment, the centerline average surface roughness Ra as measured by a noncontact surface profile measuring apparatus on the surface of the magnetic layer can be employed as an indicator of the surface smoothness of the magnetic layer. The centerline average surface roughness Ra as measured by a noncontact surface profile measuring apparatus refers to the centerline average surface roughness Ra measured in a region of the surface of the magnetic layer measuring 350 µm×260 µm using a 20× object lens. An optical three-dimensional roughness meter, for example, can be used as the noncontact surface profile measuring apparatus. For example, a NEWVIEW (Japanese registered trademark) 5022, which is a contactless optical roughness measuring apparatus made by Zygo, can be employed as the measuring device.

From the perspective of reducing spacing loss, the centerline average surface roughness Ra measured by the noncontact surface profile measuring apparatus on the surface of the magnetic layer of the magnetic tape is desirably less than or equal to 1.8 nm, preferably less than or equal to 1.5 nm. Since running stability tends to decrease when the surface of the magnetic layer is extremely smooth, greater than or equal to 0.2 nm is desirable from the perspective of running stability.

In one embodiment, a centerline average surface roughness Ra as measured by an atomic force microscope on the surface of the magnetic layer can be employed as an indicator of the surface smoothness of the magnetic layer. The centerline average surface roughness Ra as measured by an atomic force microscope refers to the centerline average surface roughness Ra as measured in a region of the magnetic layer surface with an area of 40 µm×40 µm. By way of example, a NANOSCOPE (Japanese registered trademark) III made by Digital Instruments can be employed in contact mode as the atomic force microscope. From the perspective of reducing spacing loss, the centerline average surface roughness Ra as measured with an atomic force microscope on the surface of the magnetic layer of the magnetic tape is desirably less than or equal to 2.5 nm, preferably less than or equal to 2.2 nm. Further, from the perspective of running stability in the same manner as above, it is desirably greater than or equal to 0.5 nm, preferably greater than or equal to 1.0 nm.

The two types of centerline surface roughness set forth above differ in terms of the area measured and the method of measurement. The former is primarily an indicator of the waviness of the surface of the magnetic layer and the latter is primarily an indicator of whether coarse protrusions are present on the surface of the magnetic layer. From the perspective of reducing spacing loss, at least one of the two desirably falls within the above desirable range, with both preferably falling within the above desirable ranges. However, increasing the smoothness of the surface of the magnetic layer in this manner is not necessarily desirable from the perspective of running durability. The smoother the surface of the magnetic layer becomes, the more ability of the surface of the magnetic layer to remove material adhering to the head tends to decrease. Accordingly, increasing the quantity of abrasive can be one conceivable means of increasing the ability to remove material adhering to the head. However, when the quantity of abrasive is increased, the fill rate of the ferromagnetic powder in the magnetic layer decreases, tending to compromise electromagnetic characteristics. Accordingly, from the perspective of enhancing electromagnetic characteristics, it is desirable to increase the running durability without increasing the quantity of abrasive.

By contrast, in the magnetic tape of an aspect of the present invention, even when the magnetic layer has the surface smoothness set forth above, it is possible to enhance the running durability, more specifically, enhance the running durability at low temperature and low humidity, by satisfying Equation 1 as set forth above. This is desirable in order to achieve both enhanced running durability and enhanced electromagnetic characteristics due to reduced spacing loss.

An example of one means of enhancing the smoothness of the surface of the magnetic layer is to increase dispersion of the abrasive in the magnetic layer. From the perspective of reducing the centerline average surface roughness Ra as measured by atomic force microscopy on the surface of the magnetic layer as set forth above, it is also desirable to increase dispersion of the abrasive. Thus, in preparing the coating composition for forming the magnetic layer, the abrasive is desirably dispersed separately from the ferromagnetic powder, and preferably dispersed separately from various granular or powder components, including the ferromagnetic powder.

Another example of a means of enhancing the smoothness of the surface of the magnetic layer is to use components (dispersing agents for the abrasive) to enhance dispersion of the abrasive. Examples of such components are phenolic hydroxyl group-containing aromatic hydrocarbon compounds. Phenolic hydroxyl groups refer to hydroxyl groups directly bonded to aromatic rings.

The aromatic ring contained in an aromatic hydrocarbon compound having a phenolic hydroxyl group can be monocyclic, have a polycyclic structure, or be a fused ring. From the perspective of enhancing dispersion of the abrasive, an aromatic hydrocarbon compound containing a benzene ring or a naphthalene ring is desirable. The aromatic hydrocarbon compound can have one or more substituents other than phenolic hydroxyl groups. From the perspective of ease of obtaining the compound, examples of substituents other than phenolic hydroxyl groups are halogen atoms, alkyl groups, alkoxy groups, amino groups, acyl groups, nitro groups, nitroso groups, and hydroxyalkyl groups. Among compounds having substituents other than phenolic hydroxyl groups, compounds having substituents exhibiting an ability to donate electrons in the form of a Hammett substituent constant of less than or equal to 0.4 tend to be advantageous to dispersion of the abrasive. From this perspective, examples of desirable substituents are those exhibiting an ability to donate electrons that is greater than or equal to that of halogen atoms, and more specifically, halogen atoms, alkyl groups, alkoxy groups, amino groups, and hydroxyalkyl groups.

One, two, three, or more phenolic hydroxyl groups can be contained in the above aromatic hydrocarbon compound. When the aromatic ring present in the aromatic hydrocarbon compound is a naphthalene ring, two or more phenolic hydroxyl groups are desirably contained, and two are preferably contained. Examples of such compounds are the naphthalene ring-containing compounds denoted by general formula (1) in Japanese Unexamined Patent Publication (KOKAI) No. 2013-229090, which is expressly incorporated herein by reference in its entirety. Reference can be made to paragraphs 0028 to 0030 of the same for details regarding naphthalene ring-containing compounds denoted by general formula (1) in Japanese Unexamined Patent Publication (KOKAI) No. 2013-229090. Additionally, aromatic hydrocarbon compounds containing aromatic rings in the form of benzene rings desirably contain one or more phenolic hydroxyl group, preferably one or two. Examples of such compounds are the benzene ring-containing compounds denoted by general formula (2) in Japanese Unexamined Patent Publication (KOKAI) No. 2013-229090. Reference can be made to paragraphs 0032 to 0034 of the same for details regarding the benzene ring-containing compounds denoted by general formula (2) in Japanese Unexamined Patent Publication (KOKAI) No. 2013-229090.

One, two, or more aromatic hydrocarbon compounds containing phenolic hydroxyl groups can be employed. The quantity employed is desirably, for example, about 2 weight parts to 20 weight parts per 100 weight parts of abrasive.

Inorganic powder with a Mohs hardness of greater than 8 is desirably employed, and inorganic powder with a Mohs hardness greater than or equal to 9 is preferably employed as the abrasive. The maximum Mohs hardness is the 10 of diamond. Specific examples are alumina ($Al_2O_3$), silicon carbide, boron carbide ($B_4C$), TiC, cerium oxide, zirconium oxide ($ZrO_2$), and diamond powder. Of these, alumina is desirable. Alumina is also a desirable abrasive in that particularly good improvement in dispersion can be achieved by combining alumina with the above aromatic hydrocarbon compound having phenolic hydroxyl groups. Reference can be made to paragraph 0021 in Japanese Unexamined Patent Publication (KOKAI) No. 2013-229090 with regard to alumina. The specific surface area can be employed as an indicator of the particle size of the abrasive. The greater the specific surface area, the smaller the particle size. From the perspective of increasing the smoothness of the surface of the magnetic layer, the specific surface area as measured by the BET method (BET specific surface area) of the abrasive employed is desirably greater than or equal to 14 $m^2/g$. From the perspective of dispersion, an abrasive with a BET specific surface area of less than or equal to 40 $m^2/g$ is desirably employed. The content of the abrasive in the magnetic layer is desirably 1 weight part to 20 weight parts per 100 weight parts of ferromagnetic powder.

Granular nonmagnetic materials (nonmagnetic particles) can be contained in the magnetic layer to control friction characteristics (reduce the coefficient of friction). From the perspective of increasing the surface smoothness of the magnetic layer, the nonmagnetic particles are desirably in the form of colloidal particles (nonmagnetic colloidal particles). The average primary particle size of the nonmagnetic colloidal particles is desirably 50 nm to 200 nm. The average primary particle size of the nonmagnetic colloidal particles in the present invention is a value that is determined by the method described in paragraph 0015 in Japanese Unexamined Patent Publication (KOKAI) No. 2011-48878, which is expressly incorporated herein by reference in its entirety. The nonmagnetic colloidal particles are desirably in the form of inorganic colloidal particles, preferably inorganic oxide colloidal particles. From the perspective of availability of monodisperse colloidal particles, silica colloidal particles (colloidal silica) are preferred. Reference can be made to paragraph 0023 in Japanese Unexamined Patent Publication (KOKAI) No. 2011-48878, for details regarding nonmagnetic colloidal particles. The content of the nonmagnetic colloidal particles in the magnetic layer is desirably 0.5 weight part to 5 weight parts, preferably 1 weight part to 3 weight parts, per 100 weight parts of ferromagnetic powder.

The magnetic layer set forth above is directly provided on a nonmagnetic support, or is provided over another layer such as a nonmagnetic layer. Details regarding the nonmagnetic layer and the nonmagnetic support will be given further below.

<Nonmagnetic Layer>

The nonmagnetic layer will be described below. The magnetic tape of an aspect of the present invention can comprise a nonmagnetic layer containing nonmagnetic powder and binder between the nonmagnetic support and the magnetic layer. The nonmagnetic powder that is employed in the nonmagnetic layer can be an organic or an inorganic material. Carbon black and the like can also be employed. Examples of inorganic materials are metals, metal oxides, metal carbonates, metal sulfates, metal nitrides, metal carbides, and metal sulfides. Nonmagnetic powders of these materials are available as commercial products and can be manufactured by known methods. For details, reference can be made to paragraphs 0146 to 150 in Japanese Unexamined Patent Publication (KOKAI) No. 2011-216149. For carbon black that can be employed in the nonmagnetic layer, reference can be made to paragraphs 0040 to 0041 in Japanese Unexamined Patent Publication (KOKAI) No. 2010-24113.

The binders, lubricants, dispersing agents, and other additives, solvents, dispersion methods, and the like of the magnetic layer are also suitable for use for the nonmagnetic layer. Techniques that are known for magnetic layers can also be applied to the quantity and type of binder, the quantities and types of dispersing agents and other additives added, and the like.

<Nonmagnetic Support>

The nonmagnetic support will be described below. Examples of nonmagnetic supports are known supports such as biaxially stretched polyethylene terephthalate, polyethylene naphthalate, polyamide, polyamide-imide, and aromatic polyamide. Among these, polyethylene terephthalate, polyethylene naphthalate, and polyamide are desirable.

These supports can be subjected in advance to corona discharge, plasma treatment, adhesion-enhancing treatment, heat treatment, or the like.

<Layer Structure>

With regard to the thickness of each layer and the nonmagnetic support in the magnetic tape of an aspect of the present invention, the thickness of the nonmagnetic support is desirably 3.0 µm to 80.0 µm, preferably 3.0 µm to 5.0 µm. The thickness of the magnetic layer can be optimized based on the amount of saturation magnetization of the magnetic head employed, the length of the head gap, and the bandwidth of the recording signal. Generally, it can be 10 nm to 150 nm, desirably 20 nm to 120 nm, and preferably 30 nm to 100 nm, from the perspective of high-density recording. It suffices for the magnetic layer to be comprised of a least one layer, but it can separated into two or more layers having different magnetic characteristics. The structures of known multilayer magnetic layers can be applied.

The thickness of the nonmagnetic layer is for example 0.1 µm to 3.0 µm, desirably 0.1 µm to 2.0 µm, and preferably 0.1 µm to 1.5 µm. The nonmagnetic layer of the magnetic tape of an aspect of the present invention includes an essentially nonmagnetic layer containing trace quantities of ferromagnetic powder, for example, either as impurities or intentionally, in addition to the nonmagnetic powder. The essentially nonmagnetic layer means a layer exhibiting a residual magnetic flux density of equal to or less than 10 mT, a coercive force of equal to or less than 7.96 kA/m (100 Oe), or a residual magnetic flux density of equal to or less than 10 mT and a coercive force of equal to or less than 7.96 kA/m (100 Oe). The nonmagnetic desirably has no residual magnetic flux density or coercive force.

<Backcoat Layer>

A backcoat layer can be provided on the opposite surface of the nonmagnetic support from that on which the magnetic layer is present in the magnetic tape of an aspect of the present invention. The backcoat layer desirably comprises carbon black and inorganic powder. The formula of the magnetic layer and nonmagnetic layer can be applied to the binder and various additives used to form the backcoat layer. The thickness of the backcoat layer is desirably equal to or less than 0.9 µm, preferably 0.1 µm to 0.7 µm.

<Total Thickness of Magnetic Tape, Coercive Force>

From the perspective of increasing the recording capacity of the magnetic tape, it is desirable to reduce the thickness of the magnetic tape in order to increase the recording capacity per magnetic tape cartridge. The total thickness of the magnetic tape of an aspect of the present invention comprising the various above-described layers and nonmagnetic support is not specifically limited. From the perspective of reducing the thickness thereof, the total thickness of the magnetic tape is desirably less than or equal to 6 µm. In this regard, the total thickness of the magnetic tape is preferably less than or equal to 5 µm. From the perspective of ease of handling the magnetic tape and the like, the total thickness of the magnetic tape is desirably greater than or equal to 1 µm. The lower the total thickness, the more difficult it becomes to maintain the running durability of the magnetic tape. However, as set forth above, since $\Delta$SFD as calculated with Equation 1 of the magnetic tape of an aspect of the present invention falls within a range of 0.35 to 1.50, it is possible to both reduce the thickness of the magnetic tape and achieve good running durability at low temperature and low humidity.

The thickness of various layers and the nonmagnetic support, as well as the total thickness of the magnetic tape can be determined by known film thickness measuring methods. As an example, the cross-section in the direction of thickness of the magnetic tape can be exposed by a known technique such as ion beam or microtome. Subsequently, the exposed cross-section can be observed by a scanning electron microscope. When observing the cross-section, various thicknesses can be determined as the thickness determined at one spot in the direction of thickness, or the arithmetic average of the thickness as determined in two or more spots. The thickness of the various layers can be determined as the design thickness as calculated based on the manufacturing conditions.

From the perspective of further enhancing the ability to retain recordings, the coercive force Hc of the magnetic tape in the longitudinal direction desirably falls within a range of 96 kA/m to 279 kA/m (1,200 Oe to 3,500 Oe). The coercive force Hc in the longitudinal direction of the magnetic tape can be controlled by means of the coercive force of the ferromagnetic powder contained in the magnetic layer.

<Manufacturing Process>

The coating compositions (coating liquids) for forming the magnetic layer, nonmagnetic layer, and backcoat layer normally contain solvent in addition to the various components set forth above. The various organic solvents that are commonly employed to manufacture particulate magnetic tapes can be employed as the solvent. The process of preparing the coating composition for forming each layer normally comprises at least a kneading step, dispersing step, and mixing steps provided as needed before and after these steps. The various steps can each be divided into two or more steps. All of the starting materials employed in an aspect of the present invention, such as ferromagnetic powder, nonmagnetic powder, binder, various abrasives that can be optionally added, and solvent, can be added either initially during the step or part way through. Any individual starting material can be divided for addition in two or more steps. In preparing the coating composition for forming the magnetic layer, as set forth above, the abrasive is desirably dispersed separately from the ferromagnetic powder. Known manufacturing techniques can be used to manufacture the magnetic tape of an aspect of the present invention. A device with powerful kneading strength such as an open kneader, continuous kneader, pressure kneader, or extruder is desirably employed in the kneading step. Details regarding the kneading processing are described in Japanese Unexamined Patent Publication (KOKAI) Heisei Nos. 1-106338 and 1-79274, which are expressly incorporated herein by reference in their entirety. Further, glass beads and other beads can be employed to disperse the coating compositions for forming the various layers. Dispersion beads with high specific gravities such as zirconia beads, titania beads, and steel beads are suitably employed as such dispersion beads. The particle diameter and fill rate of the dispersion beads can be optimized for use. A known dispersing apparatus can be employed. As set forth above, one means of obtaining a magnetic tape having ΔSFD calculated with Equation 1 that falls within a range of 0.35 to 1.50 is desirably to intensify the dispersion conditions (lengthen the dispersion period, reduce the diameter and increase the filling of the dispersion beads employed, and the like). Reference can be made, for example, to paragraphs 0051 to 0057 in Japanese Unexamined Patent Publication (KOKAI) No. 2010-24113, which is expressly incorporated herein by reference in its entirety, for details regarding methods of manufacturing magnetic tapes. Reference can be made to paragraph 0052 in Japanese Unexamined Patent Publication (KOKAI) No. 2010-24113, regarding orientation treatment. As set forth above, one means of obtaining a magnetic tape with ΔSFD calculated with Equation 1 that falls within a range of 0.35 to 1.50 is desirably to conduct vertical orientation. It is also desirable not to conduct orientation treatment (to conduct non-orientation).

EXAMPLES

The present invention will be described in greater detail below through Examples. However, the present invention is not limited to the embodiments shown in Examples. The "parts" and "percent" indicated below denote "weight parts" and "weight percent," respectively, unless otherwise stated.

The weight average molecular weight set forth below is a value obtained by measurement under the conditions given below by gel permeation chromatography (GPC) and polystyrene conversion.

GPC device: HLC-8120 (made by Tosoh)
Column: TSK gel Multipore HXL-M (made by Tosoh, 7.8 mm ID (inner diameter)×30.0 cm)
Eluent: Tetrahydrofuran (THF)

Example 1

1. Preparation of Alumina Dispersion

Per 100.0 parts of alumina powder with an alpha conversion rate of about 65% and a BET specific surface area of 30 $m^2/g$ (HIT-70, made by Sumitomo Chemical Co., Ltd.) were mixed 3.0 parts of 2,3-dihydroxynaphthalene (made by Tokyo Chemical Industry Co., Ltd.), 31.3 parts of 32% solution (solvent in the form of mixed solvent of methyl ethyl ketone and toluene) of polyester polyurethane resin (UR-4800, made by Toyobo) containing polar groups in the form of $SO_3Na$ groups (polar group content: 80 meq/kg), and 570.0 parts of solvent in the form of 1:1 (weight ratio) mixed solution of methyl ethyl ketone and cyclohexanone. The mixture was dispersed for five hours in a paint shaker in the presence of zirconia beads. Following dispersion, the dispersion and beads were separated with a mesh to obtain alumina dispersion.

2. Formula of Magnetic Layer Coating Liquid

| (Magnetic liquid) | |
|---|---|
| Ferromagnetic hexagonal barium ferrite powder (see Table 1) | 100.0 parts |
| $SO_3Na$ group-containing polyurethane resin (weight average molecular weight: 70,000, $SO_3Na$ groups: 0.2 meq/g) | 14.0 parts |
| Cyclohexanone: | 150.0 parts |
| Methyl ethyl ketone | 150.0 parts |
| (Abrasive liquid) | |
| Aumina dispersion prepared in 1. above | 6.0 parts |
| (Silica sol) | |
| Colloidal silica (average particle size: 100 nm) | 2.0 parts |
| Methyl ethyl ketone | 1.4 parts |
| (Other components) | |
| Stearic acid | 2.0 parts |
| Butyl stearate | 6.0 parts |
| Polyisocyanate (Coronate (Japanese registered trademark) made by Nippon Polyurethane Industry Co., Ltd.) | 2.5 parts |
| (Finishing solvent) | |
| Cyclohexanone | 200.0 parts |
| Methyl ethyl ketone | 200.0 parts |

3. Formula of Nonmagnetic Layer Coating Liquid

| | |
|---|---|
| Nonmagnetic inorganic powder: α-iron oxide | 100.0 parts |
| Average particle size (average major axis length): | 10 nm |
| Average acicular ratio: | 1.9 |
| BET specific surface area: | 75 $m^2/g$ |
| Carbon black | 20.0 parts |
| Average particle size: | 20 nm |
| $SO_3Na$ group-containing polyurethane resin (weight average molecular weight: 70,000; $SO_3Na$ groups: 0.2 meq/g) | 18.0 parts |
| Stearic acid | 1.0 group |
| Cyclohexanone | 300.0 parts |
| Methyl ethyl ketone | 300.0 parts |

4. Formula of Backcoat Layer Coating Liquid

| | |
|---|---|
| Nonmagnetic inorganic powder: α-iron oxide | 80.0 parts |
| Average particle size (average major axis length): | 0.15 μm |

-continued

| | |
|---|---|
| Average acicular ratio: | 7 |
| BET specific surface area: | 52 m²/g |
| Carbon black | 20.0 parts |
| Average particle size: | 20 nm |
| Vinyl chloride copolymer | 13.0 parts |
| Sulfonate group-containing polyurethane resin | 6.0 parts |
| Phenylphosphonic acid | 3.0 parts |
| Cyclohexanone | 155.0 parts |
| Methyl ethyl ketone | 155.0 parts |
| Stearic acid | 3.0 parts |
| Butyl stearate | 3.0 parts |
| Polyisocyanate | 5.0 parts |
| Cyclohexanone | 200.0 parts |

5. Preparation of Coating Liquids for Forming Various Layers

The magnetic layer coating liquid was prepared by the following method. The above magnetic liquid was prepared by dispersing (bead dispersion) for 24 hours the various components in a batch-type vertical sand mill. Dispersion beads in the form of 0.5 mm Φ zirconia beads were employed. The magnetic liquid that had been prepared and the above abrasive liquid were mixed with the other components (silica sol, other components, and finishing solvent) and dispersed for five minutes. The mixture was then treated (ultrasonic dispersion) for 0.5 minute with a batch-type ultrasonic device (20 kHz, 300 W). Subsequently, filtration was conducted with a filter having an average pore diameter of 0.5 μm to prepare a magnetic layer coating liquid. A portion of the magnetic layer coating liquid that had been prepared was collected and the dispersion particle diameter, an indicator of dispersion of the ferromagnetic powder (ferromagnetic hexagonal barium ferrite powder) was measured by the method set forth further below. The value that was measured is given in Table 1.

The nonmagnetic layer coating liquid was prepared by the following method. The various components excluding the stearic acid, cyclohexanone, and methyl ethyl ketone were dispersed for 24 hours in a batch-type vertical sand mill to obtain dispersion. Dispersion beads in the form of 0.1 mm Φ zirconia beads were employed. The remaining components were added to the dispersion and stirred with a dissolver. The dispersion thus obtained was filtered with a filter having an average pore diameter of 0.5 μm to prepare a coating liquid for forming the nonmagnetic layer.

A backcoat layer coating liquid was prepared by the following method. The various components excluding the lubricants (stearic acid and butyl stearate), polyisocyanate, and cyclohexanone were kneaded in an open kneader and diluted. Subsequently, the mixture was subjected to 12 passes of dispersion treatment in a horizontal bead mill disperser using 1 mm Φ zirconia beads at a bead fill rate of 80%, a rotor tip peripheral speed of 10 m/s, and a single pass residence time of 2 minutes. Subsequently, the remaining components were added to the dispersion obtained and the mixture was stirred in a dissolver. The dispersion thus obtained was filtered with a filter having an average pore diameter of 1 μm to prepare a backcoat layer coating liquid.

6. Fabrication of Magnetic Tape

The nonmagnetic layer coating liquid prepared in 5. above was coated and dried to a thickness of 0.1 μm on the surface of a support made of polyethylene naphthalate 5.0 μm in thickness. Subsequently, the magnetic layer coating liquid prepared in 5. above was coated in a quantity calculated to yield a thickness of 70 nm upon drying. Before the magnetic layer coating liquid had dried, a magnetic field with a magnetic field strength of 0.3 T was applied in a direction perpendicular to the coating surface to conduct vertical orientation treatment, after which the coating liquid was dried. Subsequently, the backcoat layer coating liquid prepared in 5. above was coated and dried to a thickness of 0.4 μm on the opposite surface of the polyethylene naphthalate support from that on which the nonmagnetic layer and magnetic layer had been formed.

A calender comprised of metal rolls was then used to conduct a surface smoothing treatment at a temperature of 100° C., a linear pressure of 300 kg, and a speed of 100 m/minute. Subsequently, heat treatment was conducted for 36 hours in an environment with a temperature of 70° C. Following the heat treatment, the product was slit to ½ inch width to obtain a magnetic tape.

In the present Example as well as Examples and Comparative Examples set forth further below, the thickness of the various layers and the magnetic tape thickness (total thickness) given in Table 1 are design thicknesses calculated based on the manufacturing conditions.

7. Evaluation Methods (1) Measurement of Dispersion Particle Diameter in Magnetic Layer Coating Liquid A portion of the magnetic layer coating liquid prepared in 5. above was collected and a sample solution diluted to 1/50 by weight with the organic solvent used to prepare the coating liquid was prepared. For the sample solution prepared, the arithmetic average particle diameter measured with a light-scattering particle size distribution meter (LB500 made by Horiba) was adopted as the dispersion particle diameter.

(2) Measurement of the Average Particle Size of the Ferromagnetic Powder

The average particle size of the ferromagnetic powder (ferromagnetic hexagonal ferrite powder) was determined by the method set forth above.

(3) Measurement of $\Delta SFD_{powder}$ and Coercive Force Hc of the Ferromagnetic Powder The $\Delta SFD_{powder}$ specified by Equation 2 above and the coercive force Hc of the ferromagnetic powder (ferromagnetic hexagonal ferrite powder) were measured with a vibrating sample magnetometer (made by Toei-Kogyo Co., Ltd.) by applying a magnetic field of 796 kA/m (10 kOe).

(4) Measurement of $\Delta SFD$ and Coercive Force Hc in the Longitudinal Direction of the Magnetic Tape The $\Delta SFD$ as specified by Equation 1 above and the coercive force in the longitudinal direction of the magnetic tape were measured with a vibrating sample magnetometer (made by Toei-Kogyo Co., Ltd.) by applying a magnetic field of 796 kA/m (10 kOe).

(5) Centerline Average Surface Roughness Ra as Measured with a Noncontact Surface Profile Measuring Apparatus on the Surface of the Magnetic Layer The centerline average surface roughness Ra on the surface of the magnetic layer was measured by the method set forth above with a NEWVIEW 5022 noncontact optical roughness measuring apparatus made by Zygo Corp.

(6) Centerline Average Surface Roughness Ra as Measured with an Atomic Force Microscope on the Surface of the Magnetic Layer The centerline average surface roughness Ra on the surface of the magnetic layer was measured by the method set forth above with an atomic force microscope in the form of a NANOSCOPE III made by Digital Instruments in contact mode.

(7) Evaluating the Ability to Retain Recordings

Evaluation was conducted in an environment of 23° C.±1° C.

The reproduction output of the magnetic tape that had been fabricated was determined as follows. A recording head (metal-in-gap (MIG) head, gap length 0.15 μm, 1.8 T) and a reproduction giant magnetoresistive (GMR) head (reproduction track width 1 μm) were mounted on a loop tester. A signal was recorded at a linear recording density of 200 kfci. The recorded signal was then repeatedly reproduced, and the recording signal decay during the period from recording to reproduction was measured. The lower the value of signal decay (unit: %/decade), the better the ability to retain recordings indicated. The measurement threshold of the measurement device was −0.5%/decade. Thus, a value at or below the measurement threshold was noted as "−0.5 or less" (unit: %/decade). For a measured value less than or equal to −0.7%/decade, the data backup tape was determined to afford adequate ability to retain recordings in terms of practical use.

(8) Evaluation of Running Durability (AlFeSil Wear Width)

In an atmosphere in which the temperature was controlled to 13° C. and the relative humidity to 15%, the surface of the magnetic layer of the magnetic tape was brought into contact orthogonally in a longitudinal direction with one edge of a square bar of AlFeSil (square bar specified in ECMA-288/Annex H/H2) at a lapping angle of 12 degrees. In that state, a 580 m length of magnetic tape was run back and forth 50 times at a speed of 3 m/s at a tension of 1.0 N.

The edge of the square rod was observed from above with an optical microscope and the wear width (AlFeSil wear width) described based on FIG. 1 in paragraph 0015 of Japanese Unexamined Patent Publication (KOKAI) No. 2007-026564, which is expressly incorporated herein by reference in its entirety, was determined. When the wear width thus determined was greater than or equal to 15 μm, good running durability at low temperature and low humidity of the surface of the magnetic layer was determined to have been maintained by removing material adhering to the head.

Examples 2 to 9, Comparative Examples 1 to 5

Table 1 gives the ferromagnetic powder used to prepare the magnetic tapes of Examples 2 to 9 and Comparative Examples 1 to 5, the bead dispersion time during preparation of the magnetic layer coating liquid, and whether orientation treatment was conducted. The magnetic tapes of the various Examples and Comparative Examples were fabricated and evaluated by the same method as in Example 1 with the exceptions of the information given in Table 1 and that, for Examples and Comparative Examples in which ferromagnetic metal powder was employed, that the various components of the magnetic liquid were kneaded and diluted in an open kneader before bead dispersion.

In Table 1, the use of ferromagnetic powder in the form of ferromagnetic hexagonal barium ferrite powder is denoted as BF and the use of ferromagnetic metal powder is denoted as metal.

Where "Not conducted" is recorded in the orientation treatment column, it means that no orientation treatment was conducted. Where "Vertical" is recorded, the same vertical orientation treatment as in Example 1 was conducted. And where "longitudinal" is recorded, longitudinal orientation processing was conducted by applying a magnetic field with a field strength of 0.3 T in the longitudinal direction relative to the coating surface.

The results of the above are given in Table 1.

TABLE 1

| | | Ex. 1 | Ex. 2 | Comp. Ex. 1 | Comp. Ex. 2 | Ex. 3 | Ex. 4 | Ex. 5 |
|---|---|---|---|---|---|---|---|---|
| Ferromagnetic powder | Type | BF | Metal | BF | Metal | BF | BF | BF |
| | ΔSFD (100° C.)-(25° C.) | 0.10 | 0.10 | 0.10 | 0.10 | 0.32 | 0.30 | 0.30 |
| | Hc (Oe) | 2550 | 2820 | 2550 | 3210 | 2240 | 2360 | 2360 |
| | (kA/m) | 203 | 224 | 203 | 256 | 178 | 188 | 188 |
| | Average particle size | 22 | 36 | 22 | 40 | 25 | 27 | 27 |
| Dispersion particle diameter (nm) | | 80 | 50 | 20 | 35 | 35 | 50 | 50 |
| Bead dispersion time (hours) | | 24 | 35 | 48 | 40 | 40 | 35 | 35 |
| Orientation treatment | | Vertical | Vertical | Not conducted | Longitudinal | Not conducted | Not conducted | Vertical |
| Magnetic tape ΔSFD (25° C.)-(−190° C.) | | 0.38 | 0.55 | 0.04 | 0.03 | 0.35 | 0.82 | 1.43 |
| Hc in longitudinal direction of magnetic tape | (Oe) | 2670 | 1840 | 2480 | 3480 | 62230 | 2440 | 1550 |
| | (kA/m) | 213 | 146 | 197 | 277 | 178 | 194 | 123 |
| Total thickness of magnetic tape (μm) | | 5.5 | 5.5 | 5.5 | 5.5 | 5.5 | 6.0 | 5.8 |
| Centerline average surface roughness Ra of magnetic layer surface (nm) | Measuring apparatus: Noncontact surface profile measuring apparatus | 1.5 | 1.5 | 1.5 | 1.5 | 1.5 | 1.5 | 1.5 |
| | Measuring apparatus: Atomic force microscope | 2.2 | 2.2 | 2.2 | 2.2 | 2.2 | 2.2 | 2.2 |
| Signal decay (%/decade) | | −0.5 or less | −0.5 or less | −0.5 or less | −0.5 or less | −0.5 or less | −0.5 or less | −0.7 |
| AlFeSil wear width at temperature of 13° C. and relative humidity of 15% (μm) | | 16 | 19 | 6 | 6 | 16 | 21 | 25 |

| | | Comp. Ex. 3 | Ex. 6 | Comp. Ex. 4 | Ex. 7 | Ex. 8 | Ex. 9 | Comp. Ex. 5 |
|---|---|---|---|---|---|---|---|---|
| Ferromagnetic powder | Type | BF | Metal | Metal | BF | BF | BF | BF |
| | ΔSFD (100° C.)-(25° C.) | 0.30 | 0.80 | 0.80 | 0.80 | 0.80 | 1.20 | 1.20 |
| | Hc (Oe) | 2380 | 2810 | 2750 | 2550 | 2650 | 2040 | 2540 |
| | (kA/m) | 188 | 224 | 219 | 203 | 211 | 162 | 202 |
| | Average particle size | 27 | 35 | 30 | 20 | 24 | 28 | 30 |
| Dispersion particle diameter (nm) | | 20 | 35 | 50 | 20 | 35 | 35 | 50 |
| Bead dispersion time (hours) | | 48 | 40 | 35 | 48 | 40 | 40 | 35 |

TABLE 1-continued

| | | | | | | | | |
|---|---|---|---|---|---|---|---|---|
| Orientation treatment | | Not conducted | Not conducted | Not conducted | Not conducted | Longitudinal | Not conducted | Not conducted |
| Magnetic tape ΔSFD (25° C.)-(-190° C.) | | 0.24 | 0.79 | 1.65 | 0.52 | 0.45 | 1.36 | 1.80 |
| Hc in longitudinal direction of magnetic tape | (Oe) | 2430 | 2950 | 2770 | 2610 | 3250 | 1960 | 2370 |
| | (kA/m) | 193 | 235 | 220 | 206 | 259 | 158 | 189 |
| Total thickness of magnetic tape(μm) | | 5.5 | 5.5 | 5.5 | 5.5 | 5.5 | 5.5 | 5.5 |
| Centerline average surface roughness Ra of magnetic layer surface (nm) | Measuring apparatus: Noncontact surface profile measuring apparatus | 1.5 | 1.5 | 1.5 | 1.5 | 1.5 | 1.5 | 1.5 |
| | Measuring apparatus:Atomic force microscope | 2.2 | 2.2 | 2.2 | 2.2 | 2.2 | 2.5 | 2.2 |
| Signal decay (%/decade) | | -0.5 or less | -0.5 or less | -0.9 | -0.5 or less | -0.5 or less | -0.7 | -1.3 |
| AlFeSil wear width at temperature of 13° C. and relative humidity of 15% (μm) | | 11 | 21 | 28 | 18 | 18 | 24 | 28 |

Based on the results given in Table 1, a magnetic tape in which the ΔSFD specified based on Equation 1 fell within a range of 0.35 to 1.50 was found to exhibit little signal decay and good running durability as evaluated by the AlFeSil wear width at low temperature and low humidity (temperature of 13° C. and relative humidity of 15%).

Comparative Examples 6 to 14

The ferromagnetic hexagonal ferrite powders of Manufacturing Examples 1 to 9 described in paragraphs 0061 to 0067 in Japanese Unexamined Patent Publication (KOKAI) No. 2003-77116 set forth above were prepared, for comparison.

With the exception that orientation treatment in the form of the above longitudinal orientation treatment was conducted using the ferromagnetic hexagonal ferrite powders prepared, magnetic tapes were fabricated by the same methods as in Example 1 and evaluation of the items indicated in Table 2 below was conducted. Based on the results given in Table 2, the magnetic tapes of Comparison Examples 6 to 14 were found to exhibit poorer running durability than Examples indicated in Table 1 based on evaluation of the AlFeSil wear width at low temperature and low humidity.

and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

TABLE 2

| | | Comp. Ex. 6 | Comp. Ex. 7 | Comp. Ex. 8 | Comp. Ex. 9 | Comp. Ex. 10 | Comp. Ex. 11 | Comp. Ex. 12 | Comp. Ex. 13 | Comp. Ex. 14 |
|---|---|---|---|---|---|---|---|---|---|---|
| Ferromagnetic powder | Type | BF | BF | BF | BF | BF | BF | BF | BF | BF |
| | ΔSFD (100° C.)-(25° C.) | 0.09 | 0.18 | 0.17 | 0.24 | 0.45 | 0.52 | -0.05 | -0.10 | -0.13 |
| Dispersion particle diameter (nm) | | 50 | 50 | 50 | 50 | 50 | 50 | 50 | 50 | 50 |
| Orientation treatment | | Longitudinal | Longitudinal | Longitudinal | Longitudinal | Longitudinal | Longitudinal | Longitudinal | Longitudinal | Longitudinal |
| Magnetic tape ΔSFD (25° C.)-(-190° C.) | | 0.07 | 0.19 | 0.20 | 0.18 | 0.27 | 0.33 | 0.05 | 0.03 | 0.05 |
| Total thickness of magnetic tape (μm) | | 5.5 | 5.5 | 5.5 | 5.5 | 5.5 | 5.5 | 5.5 | 5.5 | 5.5 |
| Signal decay (%/decade) | | -0.5 or less | -0.5 or less | -0.5 or less | -0.5 or less | -0.5 or less | -0.5 or less | -0.5 or less | -0.5 or less | -0.5 or less |
| AlFeSil wear width at temperature of 13° C. and relative humidity of 15% (μ | | 7 | 7 | 12 | 10 | 12 | 14 | 6 | 6 | 7 |

The present invention is useful in the field of manufacturing magnetic tapes such as backup tapes.

Although the present invention has been described in considerable detail with regard to certain versions thereof, other versions are possible, and alterations, permutations

What is claimed is:

1. A magnetic tape comprising a magnetic layer comprising ferromagnetic powder and binder on a nonmagnetic support, wherein ΔSFD in a longitudinal direction of the magnetic tape as calculated with Equation 1 ranges from 0.35, to 1.43:

$$\Delta SFD = SFD_{25°\,C.} - SFD_{-190°\,C.} \quad \text{Equation 1}$$

wherein, in Equation 1, $SFD_{25°\,C.}$ denotes a switching field distribution SFD as measured in the longitudinal direction of the magnetic tape in an environment with a temperature of 25° C., and $SFD_{-190°\,C.}$ denotes a switching field distribution SFD as measured in the longitudinal direction of the magnetic tape in an environment with a temperature of −190° C.

2. The magnetic tape according to claim 1, wherein a coercive force Hc in the Longitudinal direction of the magnetic tape ranges from 96 kA/m to 279 kA/m.

3. The magnetic tape according to claim 1, which comprises a nonmagnetic Layer comprising nonmagnetic powder and binder between the nonmagnetic support and the magnetic layer.

4. The magnetic tape according to claim 2, which comprises a nonmagnetic layer comprising nonmagnetic powder and binder between the nonmagnetic support and the magnetic layer.

5. The magnetic tape according to claim 1, which has a magnetic tape thickness of less than or equal to 6.0 μm.

6. The magnetic tape according to claim 2, which has a magnetic tape thickness of less than or equal to 6.0 μm.

7. The magnetic tape according to claim 3, which has a magnetic tape thickness of less than or equal to 6.0 μm.

8. The magnetic tape according to claim 4, which has a magnetic tape thickness of less than or equal to 6.0 μm.

9. The magnetic tape according to claim 1, which has a centerline average surface roughness Ra of a surface of the magnetic layer as measured with a noncontact surface profile measuring apparatus of less than or equal to 1.8 nm.

10. The magnetic tape according to claim 1, which has a centerline average surface roughness Ra of a surface of the magnetic layer as measured with an atomic force microscope of less than or equal to 2.5 nm.

11. The magnetic tape according to claim 1, wherein the magnetic layer further comprises an abrasive.

12. The magnetic tape according to claim 1, wherein the magnetic layer further comprises nonmagnetic colloidal particles.

13. The magnetic tape according to claim 1, wherein the ferromagnetic powder is ferromagnetic hexagonal ferrite powder with an average particle size ranging from 10 nm to 50 nm.

14. The magnetic tape according to claim 1, wherein the ferromagnetic powder is ferromagnetic metal powder with an average particle size ranging from 10 nm to 50 nm.

15. The magnetic tape according to claim 1, wherein the ferromagnetic powder is ferromagnetic powder in which a difference $\Delta SFD_{powder}$ between SFD as measured in an environment with a temperature of 100° C. and SFD as measured in an environment with a temperature of 25° C. as calculated with Equation 2 ranges from 0.05 to 1.50:

$$\Delta SFD_{powder} = SFD_{powder\,100°\,C.} - SFD_{powder\,25°\,C.} \quad \text{Equation 2}$$

wherein, in Equation 2, $SFD_{powder\,100°\,C.}$ denotes a switching field distribution SFD of the ferromagnetic powder as measured in an environment with a temperature of 100° C. and $SFD_{powder\,25°\,C.}$ denotes a switching field distribution SFD of the ferromagnetic powder as measured in an environment with a temperature of 25° C.

16. The magnetic tape according to claim 1, wherein the ferromagnetic powder is ferromagnetic hexagonal ferrite powder in which a difference $\Delta SFD_{powder}$ between SFD as measured in an environment with a temperature of 100° C. and SFD as measured in an environment with a temperature of 25° C. as calculated with Equation 2, ranges from 0.05 to 1.50:

$$\Delta SFD_{powder} = SFD_{powder\,100°\,C.} - SFD_{powder\,25°\,C.} \quad \text{Equation 2}$$

wherein, in Equation 2, $SFD_{powder\,100°\,C.}$ denotes a switching field distribution SFD of the ferromagnetic powder as measured in an environment with a temperature of 100° C. and $SFD_{powder\,25°\,C.}$ denotes a switching field distribution SFD of the ferromagnetic powder as measured in an environment with a temperature of 25° C.

17. The magnetic tape according to claim 16, wherein the ferromagnetic hexagonal ferrite powder has an average particle size ranging from 10 nm to 50 nm.

18. The magnetic tape according to claim 1, wherein the ferromagnetic powder is ferromagnetic metal powder in which a difference $\Delta SFD_{powder}$, between SFD as measured in an environment with a temperature of 100° C. and SFD as measured in an environment with a temperature of 25° C. as calculated with Equation 2 ranges from 0.05 to 1.50:

$$\Delta SFD_{powder} = SFD_{powder\,100°\,C.} - SFD_{powder\,25°\,C.} \quad \text{Equation 2}$$

wherein, in Equation 2, $SFD_{powder\,100°\,C.}$ denotes a switching field distribution SFD of the ferromagnetic powder as measured in an environment with a temperature of 100° C. and $SFD_{powder\,25°\,C.}$ denotes a switching field distribution SFD of the ferromagnetic powder as measured in an environment with a temperature of 25° C.

19. The magnetic tape according to claim 18, wherein the ferromagnetic metal powder has an average particle size ranging from 10 nm to 50 nm.

* * * * *